United States Patent [19]

Gokita

[11] Patent Number: 4,668,978
[45] Date of Patent: May 26, 1987

[54] THERMAL TRANSFER COLOR IMAGE FORMING APPARATUS WITH IMAGE COLOR AND IMAGE COLOR DENSITY CONTROL FUNCTIONS

[75] Inventor: Masami Gokita, Tokyo, Japan

[73] Assignee: Kabushiki Kaisha Toshiba, Kawasaki, Japan

[21] Appl. No.: 639,344

[22] Filed: Aug. 10, 1984

[30] Foreign Application Priority Data

Aug. 24, 1983 [JP] Japan .................................. 58-154312
Aug. 24, 1983 [JP] Japan .................................. 58-154313

[51] Int. Cl.⁴ .......................... H04N 1/46; G03F 3/08; G03G 15/00; G03G 15/01
[52] U.S. Cl. ....................................... 358/78; 358/75; 355/4; 355/14 C
[58] Field of Search .................... 358/75, 75 IJ, 78, 80; 355/4, 14 C

[56] References Cited

U.S. PATENT DOCUMENTS

| 4,165,165 | 8/1979 | Iwami et al. | 355/4 |
| 4,507,685 | 3/1985 | Kawamura | 358/78 |
| 4,510,523 | 4/1985 | Kurata et al. | 358/75 |
| 4,517,590 | 5/1985 | Nagashima et al. | 358/75 |

FOREIGN PATENT DOCUMENTS 3239994 5/1983 Fed. Rep. of Germany .
3429546 2/1985 Fed. Rep. of Germany .

Primary Examiner—James J. Groody
Assistant Examiner—Randall S. Svihla
Attorney, Agent, or Firm—Cushman, Darby & Cushman

[57] ABSTRACT

A color and density mode control system for an image forming apparatus including an optical scanner and a color specifying unit for specifying the mode, i.e., colors that the apparatus is to use in making copies. Depending on the color mode selected, colors with or without halftones are used in forming copies. A color converter is also used for converting image information, obtained by the optical scanner, into color signals as specified by the color specifying unit.

10 Claims, 18 Drawing Figures

|   |   |   |   |   |   |   |   |
|---|---|---|---|---|---|---|---|
|   |   |   | 27| 28|   |   |   |
|   |   | 13| 5 | 9 | 15|   |   |
|   | 23| 11| 1 | 2 | 8 | 25|   |
| 31| 21| 7 | 4 | 3 | 12| 19| 32|
|   | 26| 16| 10| 6 | 14| 24|   |
|   |   | 20| 18| 17| 22|   |   |
|   |   |   | 29| 30|   |   |   |

(YELLOW)

FIG. 15b

|   |   |   |   |   |   |   |   |
|---|---|---|---|---|---|---|---|
| 28|   |   |   |   |   |   | 27|
| 9 | 15|   |   |   |   | 13| 5 |
| 2 | 8 | 25|   |   | 23| 11| 1 |
| 3 | 12| 19| 32| 31| 21| 7 | 4 |
| 6 | 14| 24|   |   | 26| 16| 10|
| 17| 22|   |   |   |   | 20| 18|
| 30|   |   |   |   |   |   | 29|
|   |   |   |   |   |   |   |   |

(MAGENTA)

FIG. 15c

|   |   |   |   |   |   |   |   |
|---|---|---|---|---|---|---|---|
|   |   |   |   | 20| 18| 17| 22|
|   |   |   |   |   | 29| 30|   |
|   |   |   |   |   |   |   |   |
|   |   |   |   |   | 27| 28|   |
|   |   |   |   | 13| 5 | 9 | 15|
| 25|   |   | 23| 11| 1 | 2 | 8 |
| 19| 32| 31| 21| 7 | 4 | 3 | 12|
| 24|   |   | 26| 16| 10| 6 | 14|

(CYAN)

FIG. 15d

|   |   |   |   |   |   |   |   |
|---|---|---|---|---|---|---|---|
|   |   |   |   | 13| 5 | 9 | 15|
| 25|   |   | 23| 11| 1 | 2 | 8 |
| 19| 32| 31| 21| 7 | 4 | 3 | 12|
| 24|   |   | 26| 16| 10| 6 | 14|
|   |   |   |   | 20| 18| 17| 22|
|   |   |   |   |   | 29| 30|   |
|   |   |   |   |   |   |   |   |
|   |   |   |   |   | 27| 28|   |

(BLACK)

THERMAL TRANSFER COLOR IMAGE FORMING APPARATUS WITH IMAGE COLOR AND IMAGE COLOR DENSITY CONTROL FUNCTIONS

BACKGROUND OF THE INVENTION

This invention relates to a color control system for an image forming apparatus, and more particularly to a color control system for an image forming apparatus which optically scans a document to form an image of the document on an image forming medium.

In the field of image forming apparatuses, there has recently been proposed a thermal color copy machine having a thermal ink ribbon with a plurality of colors for color copying. For copying a document, this machine optically scans the document by a scanner to gather image information of the document in terms of color light signals. The image information is converted into color signals corresponding to the colors of the thermal ink ribbon. According to the color signals converted, corresponding ink sections of the thermal ink ribbon are respectively selected to thermally transfer inks onto an image forming medium such as paper by means of a thermal head. The color transfer to the paper is performed for each color in a successive manner.

For changing copy density as desired, the prior machine changes the amount of light emitted from a light source which illuminates the document, such as a fluorescent lamp, by controlling the phase angle of the power voltage applied to the light source. The phase angle control inevitably generates noise. The noise can possibly give rise to an erroneous operation of the copy machine. This is a serious problem particularly for the color copy machine, because the color copy machine has a more complicated circuit than the monocolor copy machine, and therefore is very sensitive to noise.

Most of the prior color copy machines are very inflexible in changing from one color mode to another, for example, from a two-color mode to a single color mode, or from a single color mode to a full-color mode, etc. In contrast with this, actual color copying requires a fairly flexible color mode selection to obtain the best copy. For example, a full-color mode is preferable for photographs, two to seven color modes are preferable for graphs, and a single color made is preferable for characters.

SUMMARY OF THE INVENTION

Accordingly, an object of the present invention is to provide, by introducing a novel technical idea, a color control system for an image forming apparatus which easily switches from one color mode to another.

Another object of the present invention is to provide a color control system for an image forming apparatus which changes the density of a color copy without changing the amount of light from a light source. The invention is therefore free from operating the image forming apparatus erroneously due to the inevitable noise generated in the prior apparatus.

According to the present invention, there is provided a color control system for an image forming apparatus with an optical scanning means. The invention includes a color specifying means including a given number of single-color setters. A color setter having no halftones; a color setter having halftones; a color converting means for converting image information derived from the scanning means into color signals as specified by the color specifying means; and a means for forming an image on an image forming medium according to the color signals from the color converting means are also provided.

With such an arrangement, by simply selecting the color specifying means, the color mode of the image forming apparatus may be changed from one to another, for example, from a full-color mode to a seven color mode, from a full-color mode to a single color mode, or from a seven-color mode to a single color mode, and vice versa.

The color control system further comprises a density setting means for setting the desired density of each specified color; a density information storing means for storing information corresponding to the set density; and a means for reading out the density information corresponding to the set density from said density storing means.

This arrangement allows the density of each color used to form an image to be changed without changing the amount of light from the light source. This feature eliminates the noise problem of the prior art.

BRIEF DESCRIPTION OF THE DRAWINGS

This and other objects and features of the present invention may be best understood by reference to the specification and accompanying drawings, in which.

DETAILED DESCRIPTION OF THE PREFERRED EMBODIMENT

A preferred embodiment of the present invention will be described referring to the accompanying drawings.

Figure 1:
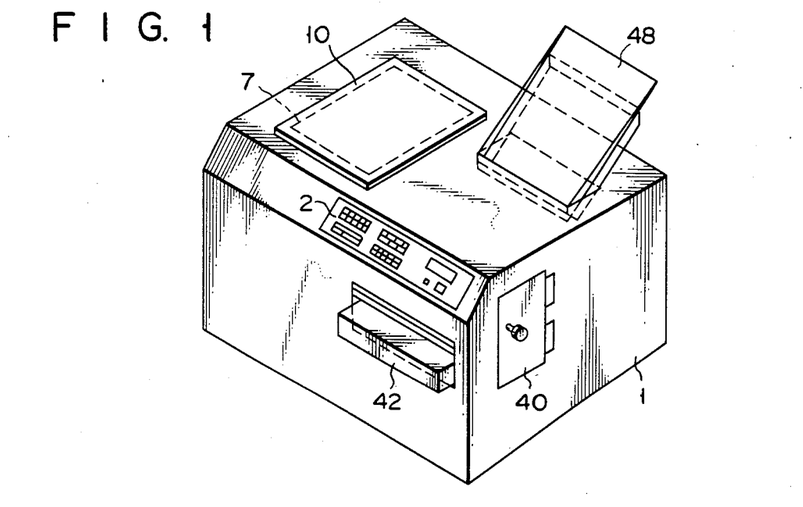
FIG. 1 perspectively illustrates an appearence of a thermal transfer color copy machine in which an embodiment of a color control system according to the present invention is applied.
Figure 2:
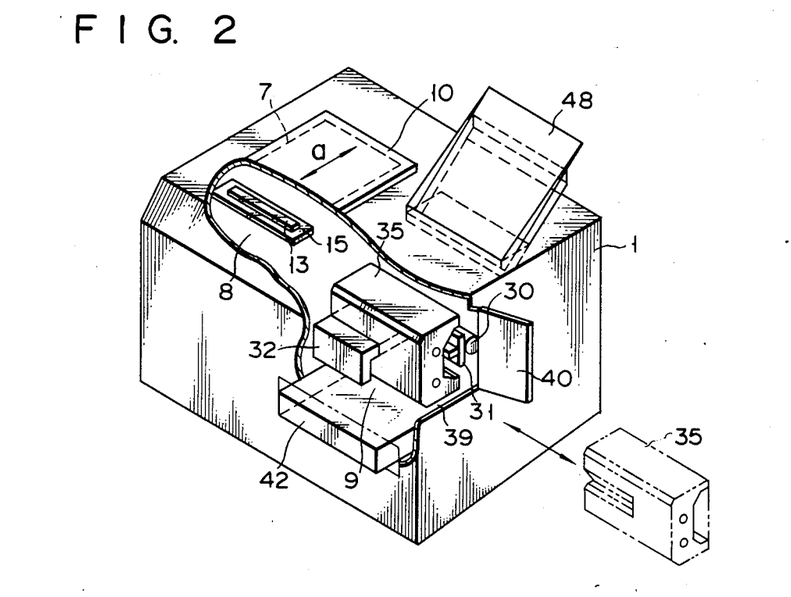
FIG. 2 perspectively illustrates the copy machine partially broken away to show part of the inside of the copy machine.

FIGS. 1 and 2 show a thermal color copy machine into which a color control system of the present invention is incorporated. As shown, a main frame 1 of the color copy machine has an operation panel 2 on the front side thereof. A scanning means 8 and an image forming means 9 are respectively located on the left and the right portions of the top surface of the main frame 1, as viewed from the front side of the copy machine. The scanning means 8 optically scans a document (not shown) placed on a document table 7 formed of a transparent glass plate, and picks up image information of the document. A cover 10, hingedly mounted to the main frame 1, is provided on the document table 7.

Figure 3:
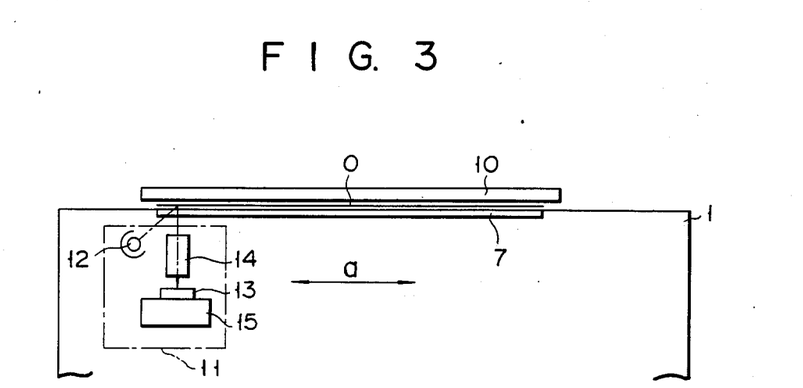
FIG. 3 shows a partial side view of a document scanning section of the copy machine of FIG. 1.
Figure 4:
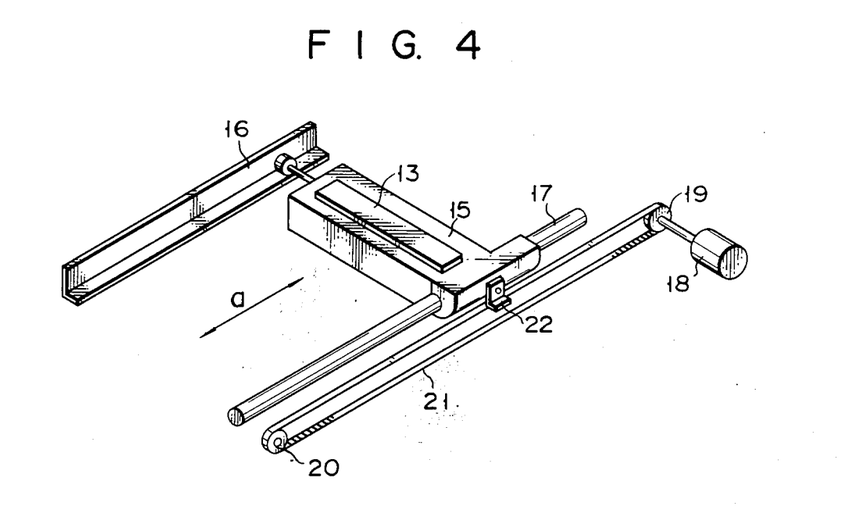
FIG. 4 perspectively illustrates a scanner drive mechanism in the document scanning section shown in FIG. 3.

The structural arrangement of the scanning means 8 is best illustrated in FIGS. 2 to 4. The document table 7 is fixed to the top surface of the main frame 1. Below the document table 7, a scanner 11 is provided for optically scanning a document 0 (FIG. 3) set on the document table 7, and reads out the image information on the document 0. The scanner 11 is comprised of a lamp 12 for illuminating the document 0, a photoelectric converter 13 for receiving the light reflected from the document 0 and converting it into a corresponding electric signal, an optical system 14 containing lenses, for example, for guiding the reflected light from the document 0 to the photoelectric converter 13, and a carriage 15 for movably supporting those components. The photoelectric converter 13, made of a CCD type line image sensor, converts the reflected light from the document 0 into color signals of green (G), yellow (Y) and cyan (C) representing the image information of the document 0. The carriage 15 is supported by the guide rail 16 and the guide shaft 17 and is reciprocately movable in the directions of arrowheads a, as shown in FIG. 4. A drive pully 19 driven by a reversible scanning motor 18, for example, a pulse motor, is disposed adjacent to one end of the guide shaft 17, while a follower pulley 20 is disposed near the other end thereof. A timing belt 21 is wound around these pulleys 19 and 20, and is fixed to part of the carriage 15. With the forward or reverse rotation of the scanning motor 18, the carriage 15 rectilinearly moves in the direction of arrowhead a.

Figure 5:
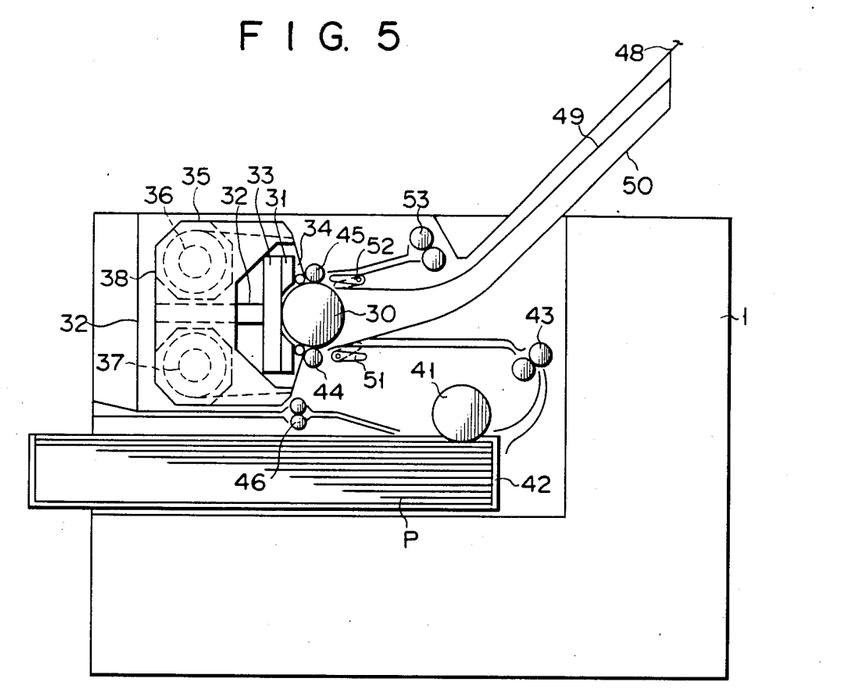
FIG. 5 shows a longitudinal sectional view of an image forming section of FIG. 1.

The image forming means 9 is structurally arranged as shown in FIGS. 2 and 5, for example. A platen roller 30 is disposed near the center of the image forming means 9. A thermal head 31 is disposed at the left of and to confront the platen roller 30. The thermal head 31 is mounted to a radiator 33 formed integrally with the back end face of a holder 32. A ribbon cassette 35 housing a rolled thermal ink ribbon 34 as thermal transfer material is removably set against the holder 32. The thermal ink ribbon 34 is partially-interposed between the thermal head 31 and the platen roller 30. As shown, the ribbon cassette 35 has a case 38 in which a pair of roll shafts 36 and 37 are provided upright to be parallel with each other, and the thermal ink ribbon 34 is fixed at both ends respectively to and wound around the roll shafts 36 and 37. The case 38 has an opening through which part of the thermal ink ribbon 34 is exposed to the outside. The thermal ink ribbon 34 is slightly pulled out and set between the platen roller 30 and the thermal head 31. When the ribbon cassette 35 is loaded into the holder 32, the roll shafts 36 and 37 are respectively coupled with the drive shafts of the motors such as pulse motors, through a drive force transmission mechanism (not shown). More specifically, the ribbon cassette 35 is put in and pulled out of the holder 32, through an opening 39 formed in the right side of the main frame 1. A cover 40 provided for the opening 39 is hingedly fixed to open and close to the main frame 1.

A feed roller 41, disposed on the lower right side of the platen roller 30, picks up and takes out sheet by sheet the image forming medium such as paper P stacked in a cassette 42, by means of the feed roller 41. In this case, the feed roller 41 rotates in press contact with the paper P. The paper P taken out by the feed roller 41 is transferred to a pair of resist rollers 43 disposed on the upper right of the feed roller 41. The resist roller pair 43 aligns the leading end of the paper P, and then feeds it toward the platen roller 30. The paper P is pressed against and around substantially half of the surface of the platen roller 30 through press rollers 44 and 45, as shown. This pressed paper ensures an accurate transfer of the paper P. The cassette 42 is removably set to the main frame 1 on the front side, as shown in FIG. 2. A pair of manual feed rollers 46 as best illustrated in FIG. 5 manually feed the desired paper (not shown) into the machine.

Figure 6:
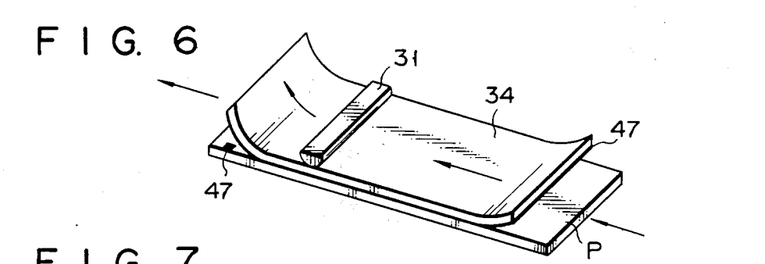
FIG. 6 diagramatically illustrates a transfer operation of the image forming section shown in FIG. 5.
Figure 7:
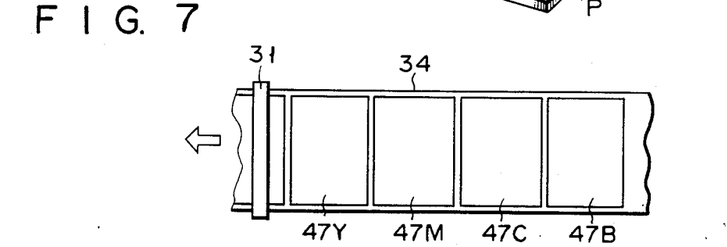
FIG. 7 shows a plan view of a thermal transfer ink ribbon used in the image forming section shown in FIG. 5.

The thermal head 31 presses the paper P against the platen roller 30, through the thermal ink ribbon 34. Under this condition, if ink 47 as a coloring material which is coated over the thermal ink ribbon 34 is heated, it is transferred to the paper P. A typical example of the thermal ink ribbon 34, each having the same width as the paper P, is illustrated in FIGS. 6 and 7. As shown, ink sections 47Y, 47M, 47C and 47B for yellow (Y), magenta (M), cyan (C) and black (B) are arranged side by side on the thermal ink ribbon 34. In operation, specific colors are transferred one by one to the paper P and are exactly superposed on the previously transferred color portion.

Figures 8, 9:
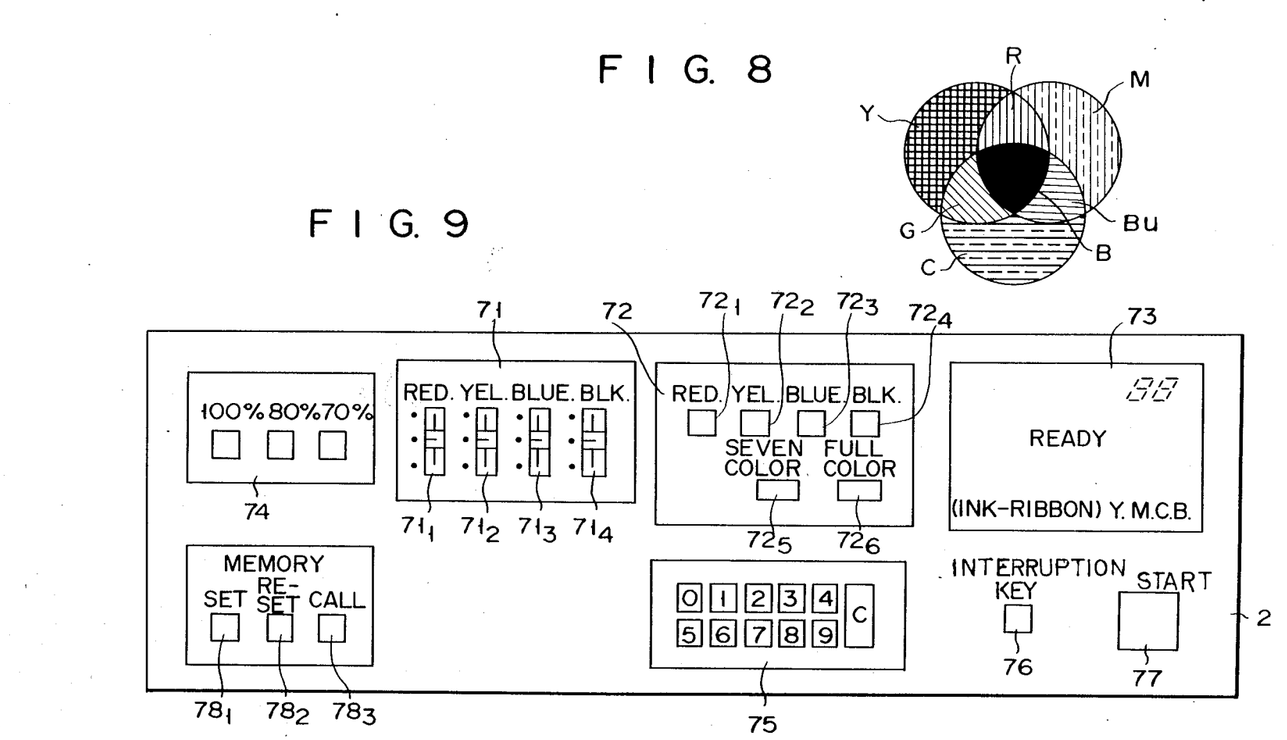
FIG. 8 diagrammatically illustrates color formation by the inks of the thermal ink ribbon of FIG. 7.
FIG. 9 shows a plan view of an operation panel of the copy machine of FIG. 1.

The thermal ink ribbon 34 is designed so as to transfer seven colors to paper P: yellow (Y), magenta (M), cyan (C), black (B), red (R), green (G), and blue (Bu), as shown in FIG. 8.

With the rotation of the platen roller 30, the paper P reciprocates between the color transfer position and the transfer start position. The number of reciprocations of the paper P is equal to the number of specified colors. Then, the paper P is directed to either a first or second guide plate 49 or 50 disposed along the lower side of a discharge tray 48 which is slanted upward and which projects from the upper surface of the main frame 1. More specifically, the paper P is directed by first and second directing gates 51 and 52 respectively located between the platen roller 30, and the ends of the first and second guide plates 49 and 50. In operation, the paper P taken out of the cassette 42 is transferred through the resist roller pair 43 and the first directing gate 51, and the leading end thereof is set to the platen roller 30. The paper P is transferred at a fixed speed along and in contact with the peripheral surface of the platen roller 30, as the platen roller 30 is rotated forward by the pulse motor (not shown). At this time, the holder 32 having a linear array of heating elements (not shown), which extends along the axis of the platen roller 30, is heated to transfer one of the inks 47 on the thermal ink ribbon 34 onto the paper P. The paper P passing over the platen roller 30 is directed at the leading end to the first guide plate 49 by the second directing gate 52, which at this time is positioned as indicated by the continuous line, and is transferred to the first guide plate 49 laid under the discharge tray 48. In this way, one color of the inks 47 is transferred to the paper P. Upon completion of the color transfer, the platen roller 30 is reversed in rotation to transfer the paper P in the reverse direction, and is returned to the transfer start position. At this time, the first directing gate 51, when swung to the position as indicated by the two-dot chain line, guides the trailing end of the paper P to the second guide plate 50 laid under the first guide plate 49. In this way, the paper P is reciprocated a plurality of times, thereby transferring a plurality of colors to the paper P. As all of the colors of ink 47 are transferred to the paper P, the paper is led to the feed roller pair 53 by the second directing gate 52, when swung to the position as indicated by the two-dot chain line. Finally, the paper P is made to exit to the discharge tray 48.

FIG. 9 shows in detail the operation panel 2. In the figure, a density setter 71 is used for setting the density of each color, for example, red, yellow, blue or black. A color setter 72 is used for designating the desired color for each copy such as red, yellow, blue or black. A display window 73 displays various operations, for example, the number of copies, if it is ready for copy or print, the color of the thermal ribbon as set, and other operating states of the machine. A multiplication setter 74 sets the desired magnification of the copy such as 100%, 80%, or 70%. A ten key section 75 sets the desired number of copies. An interruption key 76 sets the interruption mode of the copier. A start key 77 starts the copy operation. A memory section 78 stores the image information of a document. The density setter 71 includes a red density switch (RED) $71_1$, a yellow density switch (YEL) $71_2$, blue density switch (BLUE) $71_3$, and black density switch (BLK) $71_4$. Each of these switches is a slide switch. And each of these switches has a slide knob which is slidable from the center of a density scale to both extremes. When the slide knob is slid from the scale center to either extreme, the density is changed from 0 to ±50%.

The color setter 72 includes a red select key (RED) $72_1$, a yellow select key (YEL) $72_2$, a blue select key (BLUE) $72_3$, a black select key (BLK) $72_4$, a seven color select key (SEVEN COLOR) $72_5$, and a full color select key $72_6$. When the red select key $72_1$ is pushed, the color red is designated and only the color red is printed. Similarly, when the red select key $72_1$ and the black select key $72_4$ are pushed, red and black are designated and only those colors are printed. When the seven color select key (SEVEN COLOR) $72_5$ is pushed, all of the colors, red, green, yellow, blue, black, cyan and magenta are designated, and the designated full color is copied without containing the halftone. When the full color select key $72_6$ is pushed, all of the colors, red, yellow, blue and black are designated and copied containing halftone color. Each key contains an indicating lamp at the head that when pushed, lights with the designated color. When the power is on, the color select key $72_6$ lights to indicate that the full color copy mode has been set up in the copy machine. A memory section 78 includes a set key (SET) $78_1$, a reset key (RESET) $78_2$ and a call key (CALL) $78_3$. Pushing the set key (SET) $78_1$ specifies the image storage. Pushing the reset key (RESET) $78_2$ clears the image storage mode. Pushing the call key (CALL) $78_3$ specifies readout of an image already stored.

Figure 10:
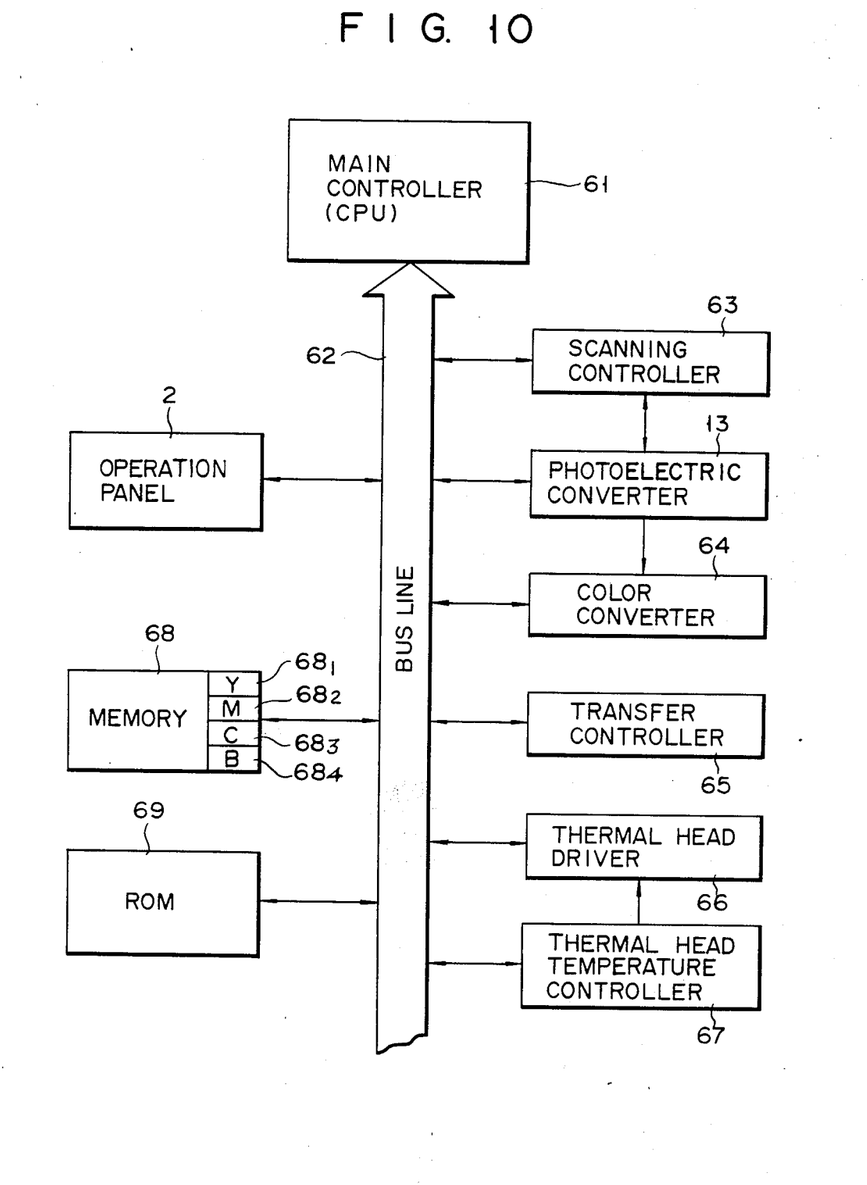
FIG. 10 shows a block diagram of a control circuit used in the copy machine shown in FIG. 1.

Turning now to FIG. 10, there is shown in block form a control circuit for controlling the operation of the overall mechanism of the thermal color copy machine structurally arranged as mentioned. A main controller 61, composed of a central proccessing unit (CPU) and its peripheral circuits, controls the operation of the overall copy machine including the color control. The main controller 61 is coupled with a bus line 62, which is also connected to the operation panel 2, the scanning controller 63, the photoelectric converter 13, the color converter 64, the transfer controller 65, the thermal head driver 66, the head temperature controller 67, a memory 68, and a ROM (read only memory) 69. In response to a signal transferred through the bus line 62 from the main controller 61, the scanning controller 63 operates and drives the lamp 12, the photoelectric converter 13 and the scanning motor 18 in the scanner 11. The photoelectric converter 13 responds to a signal coming through the bus line 62 from the main controller 61 to pick up image information on the document, and produces a color light signal, as mentioned above.

The color converter 64 processes the signal coming from the photoelectric converter 13 to convert it into color signals for yellow (Y), magenta (M), cyan (C) and black (B). Each color signal is further converted, directly or by a dither matrix, into a color signal containing halftones. Alternatively, it is converted into a color signal not containing halftones by means of a seven color matrix.

Figure 11:
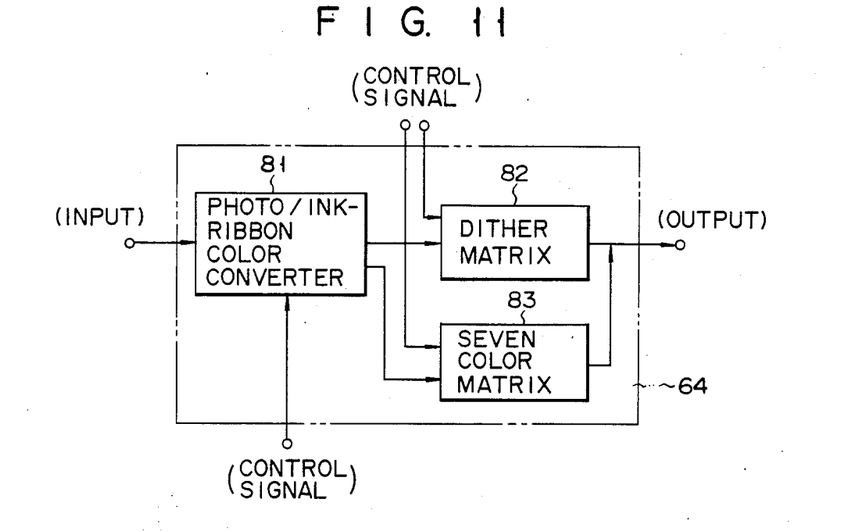
FIG. 11 is a block diagram of an arrangement of a color converting section of the control circuit of FIG. 10.

As shown in FIG. 11, the color converter 64 is composed of a photo-ink color converter 81, a dither matrix 82 and a seven color matrix 83. The photo-ink color converter 81 converts the signal output from the photoelectric converter 13 into color signals of yellow (Y), magenta (M), cyan (C) and black (Bu).

Figure 12:
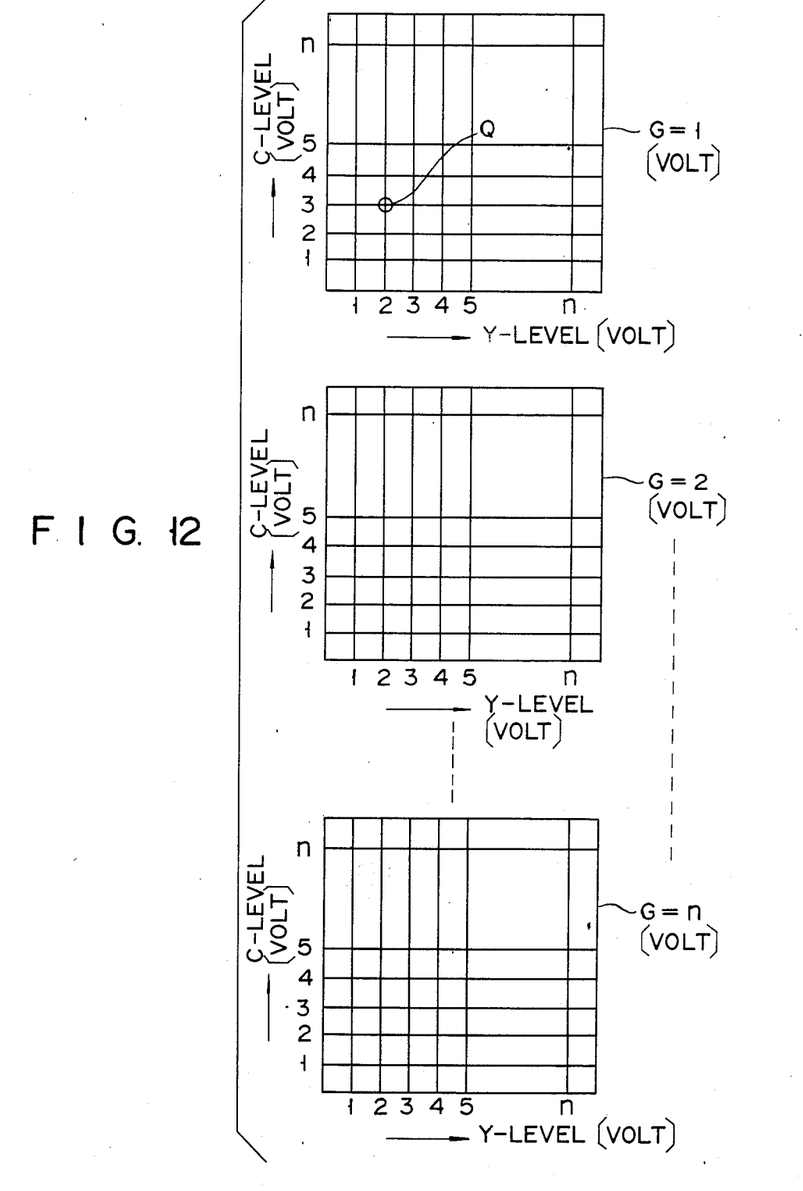
FIG. 12 illustrates a sequence of color conversion by the control circuit of FIG. 10.

The color conversion by the color converter 64 is performed in the following way, for example. This will be described referring to FIG. 12. The color converter 64 stores a plurality of tables for converting light color levels into ink color levels, as shown in FIG. 12. Assume now there are three color light signals, the first for green (G), the second for yellow (Y) and the third for cyan (C), and that the levels of the voltages from the photoelectric converter 13 in the scanner 11 are: $G=1$ V, $Y=2$ V, and $C=3$ V. In this case, in the color converter 64, a color conversion table of $G=1$ V is searched. After such a table is gained, the color level of ink stored at the coordinates Q for $Y=2$ V and $C=3$ V in the table is read out. If the thermal ink ribbon 34 has four colors, yellow (Y), magenta (M), cyan (C) and black (B), what is read out is the $Y=d$ level, $M=e$ level, $C=f$ level and $B=g$ level (d,e,f and g being variable levels depending on the color conversion table used). In this way, color conversion is performed.

Figure 13:
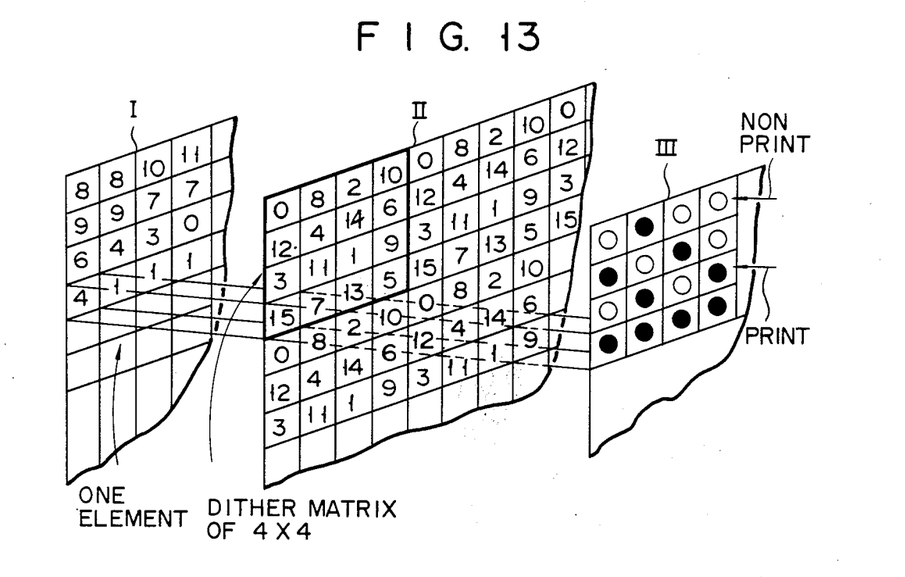
FIG. 13 diagrammatically illustrates a dither matrix section in FIG. 11.

The dither matrix 82 converts each dot into a color signal containing a half tone. To this end, a dither matrix based on the dither technique method is used for quantizing the light and shade image into binary values. More specifically, the dither matrix 82 contains a dither matrix (density information) containing threshold levels corresponding to various density levels for each ink color, which are experimentally obtained. For example, as shown in FIG. 13, the levels I of picture elements of the input image information or each dot of the color signals for the ink colors are respectively compared with the different threshold levels II of the 4×4 dither matrix. On the basis of the result of the comparison, signals III representing the printing or nonprinting of picture elements or dots are produced in the binary form, providing a dot pattern. The seven color matrix 83 converts the dots of the image into binary values by means of a matrix containing predetermined threshold levels, and into color signals not containing a half tone, which provides a dot pattern. The seven color matrix 83 includes matrices (density information) each with different threshold levels for various densities of each ink color of the ink ribbon.

The changes of the threshold levels of each matrix of the dither matrix 82, which are caused by pushing each of the density set switches $71_1$-$71_4$ are different from those of the threshold levels of the seven color matrix 83. For example, when the threshold level of the seven color matrix 83 is changed 150% from normal, the threshold level of the dither matrix 82 is changed 120%. With such a threshold level, the change in the half tone is greater and more distinctive from that in the case of the seven color print.

In FIG. 10, the color converter 64 also color converts a signal sent from the bus line 62, appropriately processes it and again sends the processed signal to the bus line 62. The transfer controller 65 operates in response to the signal transferred through the bus line 62 from the main controller 61, and controls a motor to drive the platen roller 30, a motor to drive the roll shafts 36 and 37 of the ribbon cassette 35, a motor to drive the feed roller 41, the resist roller pair 43 and the feed roller pair 53, and further solenoids (not shown) to drive the first and second directing gates 51 and 52. The thermal head driver 66 operates in response to a signal coming through the bus line 62 from the main controller 61 and a signal from the head temperature controller 67, and energizes the heating elements of the thermal head 31 in a control manner. The head temperature controller 67 responds to a signal coming through the bus line 62 from the main controller 61 to operate and produce a temperature control signal to the thermal head driver 66. The memory 68 responds to a signal coming through the bus line 62 from the main controller 61, and allows the information transferred through the bus line 62 to be stored therein or the information stored therein to be read out therefrom.

The memory 68 contains memories $68_1$ to $68_4$ for storing a dot pattern of one page for each ink ribbon, which is supplied from the color converter 64. The memory (Y) $68_1$ stores a dot pattern for yellow. The memory (M) $68_2$ stores a dot pattern for magenta. The memory (C) $68_3$ stores a dot pattern for cyan. The memory (B) $68_4$ stores a dot pattern for black. The memory 68 is backed up by a battery (not shown) to protect the contents stored from being destroyed when power is shut off.

The ROM 69 contains a conversion table which stores the density of each ink color of the ink ribbon, which corresponds to a signal specified by each of the density switches $71_1$ to $71_4$ and sent through the bus line 62 from the main controller 61.

The main controller 61 reads out from the conversion table in the ROM 69 the density of each ink color as specified by each of the density switches $71_1$ to $71_4$ in the density setter 71. The main controller 61 produces a control signal for the density of each ink color read out and applies it to the dither matrix 82 or the seven color matrix 83 in the color converter 64. In response to the control signal, either the dither matrix or the matrix having threshold levels according to the density is selected.

When the red density switch (RED) $71_1$ is set to a higher density, the matrix having threshold levels lower than the standard is selected for magenta and yellow. On the other hand, when it is set to a lower density, the matrix having the threshold levels higher than the standard ones is selected for magenta and yellow. When the yellow density switch (YEL) $71_2$ is set to a higher density, the matrix having threshold levels lower than the standard is selected for yellow. When it is set to a lower density, the matrix having threshold levels higher than the standard is selected for yellow. When the blue density switch (BLUE) $71_3$ is set to a higher density, the matrix having threshold levels lower than the standard is selected for magenta and cyan. When it is set to a lower density, the matrix having threshold levels higher than the standard is selected for the same colors. When the black density switch (BLK) $71_4$ is set to a higher density, the matrix having threshold levels lower than the standard is selected for black. When it is set to a lower density, the matrix having threshold levels higher than the standard is selected for the same color.

The operation of the color control system thus arranged will be described. For starting the copy machine, the seven color select key (SEVEN COLOR) $72_5$ is pushed, the red density switch (RED) $71_1$ is set to a higher density, and the start key 77 is pushed. Then, the main controller 61 drives the scanner 11 to start the scanning of a document. The color light signals of green (G), yellow (Y) and cyan (C), which are picked up by the scanner 11, are supplied to the photo-ink color converter 81 in the color converter 64. Upon receipt of those signals, the photo-ink color converter 81 converts the image signals into color signals of an yellow component, a magenta component, a cyan component and a black component. Those color signals are applied to the seven color matrix 83 where these are compared with the threshold levels for each color. Upon comparison a dot pattern is produced in which dots having a level greater than the threshold level are represented by 1. At this time, the matrices having the threshold levels for yellow and those for magenta, which are lower than the standard ones, have been selected. Therefore, the number of dots to be printed for magenta and yellow is increased, so that the copy density visibly changes. The dot pattern of each color is supplied through the bus line to the memory 68. The dot pattern for yellow is stored in the memory (Y) $68_1$. The dot pattern for magenta is stored in the memory (M) $68_2$. The dot pattern for cyan is stored in the memory (C) $68_3$. The pattern for black is stored in the memory (B) $68_4$.

After the dot patterns for the colors of one page of the document have been stored, the feed roller 41 takes out a sheet of paper P from the cassette 42. The paper P taken out is fed to the resist roller pair 43 and is aligned at the leading edge by the roller 43. Then, it is transferred, by the resist roller pair 43, toward the platen roller 30, and is pressed around the platen roller 30 by the press rollers 44 and 45. The paper P is transferred along and by the platen roller 30. During the transfer of the paper P, the dot pattern of the yellow component of one page, which is read out from the memory (Y) $68_1$ of the memory 68, is thermally transferred to the paper P from the yellow ink portion 47Y of the thermal ink ribbon 34 by means of the thermal head 31. The paper thus printed with the yellow component is transferred to the first guide plate 49 with rotation of the platen roller 30. Then, the platen roller 30 is reversely rotated to transfer the paper P in the reverse direction. When the reverse transfer of the paper P is completed, the paper P is transferred onto the first guide plate 50.

Subsequently, the one page dot patterns for magenta, cyan, and black, which are sequentially read out from the memory (M) $68_2$, the memory (C) $68_3$, and memory (B) $68_4$ in the memory 68, are thermally transferred onto the paper P, through the corresponding ink portions, respectively, in a similar manner to that of the transfer of the yellow component as mentioned above. The paper P printed with yellow, magenta, cyan, and black is led to the feed roller pair 53 assisted by the platen roller 30 and the second directing gate 52, and is fed out into the discharge tray 48 by means of the feed roller pair 53. At this point, the copy operation is completed.

In this way, seven or less colors, not including the halftone, can be transferred to the paper P.

Also when the red density switch (RED) $71_1$ is set to a lower density, the matrices for magenta and yellow as selected have threshold levels and are subjected to a similar operation to the above. The same thing is true for the cases when the density switches $71_2$ to $71_4$ are set to a lower or higher density.

Then, the full color select key (FULL COLOR) $72_6$ is pushed, the red density switch (RED) $71_1$ is set to a higher density, and the start key 77 is pushed to start the copy machine. The main controller 61 drives the scanner 11 to start the scanning. The light color signals of green (G), yellow (Y) and cyan (C) read out by the scanner 11 are supplied to the thermal head 31 in the color converter 64. The photo-ink color converter 81 converts the image signals supplied to a yellow component, a magenta component, a cyan component, and a black component. The dots represented by each color signal are compared, dot by dot, with the threshold levels of the dither matrix provided for each color. Of course, the level comparison is made by the dither matrix 82. As a result of the comparison, a dot pattern is produced in which only the dots with levels higher than the corresponding threshold levels are represented by "1." In this case, the dither matrix in which the threshold levels for yellow and magenta are lower than the standard, is selected. Accordingly, the number of dots for magenta and yellow are increased and the copy density visibly changes. The dot pattern for each color is supplied to the memory 68 through the bus line 62, so that the dot pattern for yellow is stored in the memory (Y) $68_1$, the dot pattern for magenta is stored into the memory (M) $68_2$ the dot pattern for cyan is stored into the memory (C) $68_3$, and the dot pattern for black is stored into the memory (B) $68_4$. After the dot patterns for the respective colors of one page of the document are stored, the machine operates as when the seven color select key (SEVEN COLOR) $72_5$ is pushed. Through such an operation, the dot patterns read out from the memories $68_1$–$68_4$ in the memory 68 are thermally transferred onto the paper P, through the corresponding ink sections. In this way, seven or more colors containing a halftone are copied on the paper P.

Also when the red density switch (RED) $71_1$ is set to a lower density, the dither matrices for magenta and yellow as selected have high threshold levels, and are subjected to a similar operation as is the above. This is true for the cases in which the remaining density switches $71_2$ to $71_4$ are set to a higher or a lower density.

In order to start the copy machine, the red select key (RED) $72_1$ is pushed, the red density switch (RED) $71_1$ is set to a higher density, and the start key 77 is pushed. The main controller 61 drives the scanner 11 which scans the document. The light color signals of green (G), yellow (Y) and cyan (C) are supplied to the photo-ink color converter 81 in the color converter 64. The photo-ink color converter 81 converts the image signal into a yellow component, a magenta component, a cyan component, and a black component. The seven color matrix 83 level compares these color signals with the threshold levels for the respective colors to produce patterns so that only the dots with levels higher than the threshold levels are expressed as binary "1's" are produced. In this case, the threshold levels for yellow and magenta that are lower than the standard have been selected. Therefore, the number of dots for magenta and yellow is increased and the copy density visibly changes. The dot patterns for the colors are applied to the memory 68, so that the dot patterns for yellow and magenta are selected and stored into the memory (Y) $68_1$ and the magenta memory (M) $68_2$. After the dot patterns for the colors of one page are stored, the machine operates as when the seven color select key (SEVEN COLOR) $72_5$ is pushed. The dot patterns read out from the memory (Y) $68_1$ and the memory (M) $68_2$ are thermally transferred onto the paper P by the corresponding ink sections, respectively. In this way, only red is copied onto the paper P. The above operation is correspondingly applied for the color transfer of the other single colors.

When the red density switch (RED) $71_1$ is set to a lower density, a higher threshold level component is selected for the magenta and yellow components at seven color matrix 83, thereby performing the aforementioned imge formation operation. Where other color density switches $71_2$ to $71_4$ are set to a lower or higher density, the same operation is carried out as in the image formation operation when red density switch $71_1$ is set.

For the next operation, any one of the keys in the color setter 72 is pushed, the set key (SET) $78_1$ is pushed, and the start key 77 is pushed. Then, the main controller 61 drives the scanner 11 to scan a document. The color light signals of green (G), yellow (Y) and cyan (C) as read out by the scanner 11 are supplied to the photo-ink color converter 81 in the color converter 64. Upon receipt of the signals, the photo-ink color converter 81 color converts the image signal supplied, that is it converts it into the components of yellow, magenta, cyan, and black. The color signals of the dots of the respective colors are supplied through the bus line 62 to the memory 68. Then, the color signal for the yellow dots is stored in the memory (Y) $68_1$; the color signal for the magenta dots is stored into the memory (M) $68_2$; the color signal of the cyan dots is stored into the memory (C) $68_3$; and the color signal of the black dots is stored into the memory (B) $68_4$. At this time, the main controller 61 stores in an internal memory a flag indicating that the color signals of the document have been stored into the memory 68.

After the color signals of all of the colors of one page are stored, the machine operates as in the case when the seven color select key (SEVEN COLOR) $72_5$ is pushed. The color signals in the memories $68_1$ to $68_4$ in the memory 68 are respectively compared with the corresponding threshold levels by the matrices in the seven color matrix 83. With the dot patterns obtained by comparison, the colors are thermally transferred to the paper P. Subsequently, the copies are continuously made according to the contents of the memory 68. This indicates that color conversion of the recorded image is possible.

Thus, in a multi-copy mode for 100 copies, for example, only one scanning operation is required if the output signals from the color conversion are stored in the memory, and are not subjected to matrix conversion. Further, if the image information frequently used is stored in the memory, its copy is quickly obtained. Actually, there may be a case in which the document scanning section and the transfer section may be used separately and differently. The storage of the image information could satisfactorily cope with such a case.

With the color signals stored in the memories $68_1$ to $68_4$ of the memory 68, image information other than that stored may be copied. In this case, the document is scanned for each color to obtain the color signals for each color components. The dot patterns corresponding to the color signals are output to the thermal head 31 directly, or are not stored in the memory 68. Those dot patterns are thermally transferred to the paper P for copy. For the copy, the stored image information can be called by the call key (CALL) $78_3$ in a desired color mode of the full-color, the seven colors, or the single color. For example, the main technical material is copied in full color and the submaterial for reference, in a single color.

In the above-mentioned embodiment, multicolors, i.e., the seven colors, either containing or not containing the halftones are transferred to the paper P. Alternatively, a single color either containing or not containing the halftones may be transferred to the copy.

Figure 14:
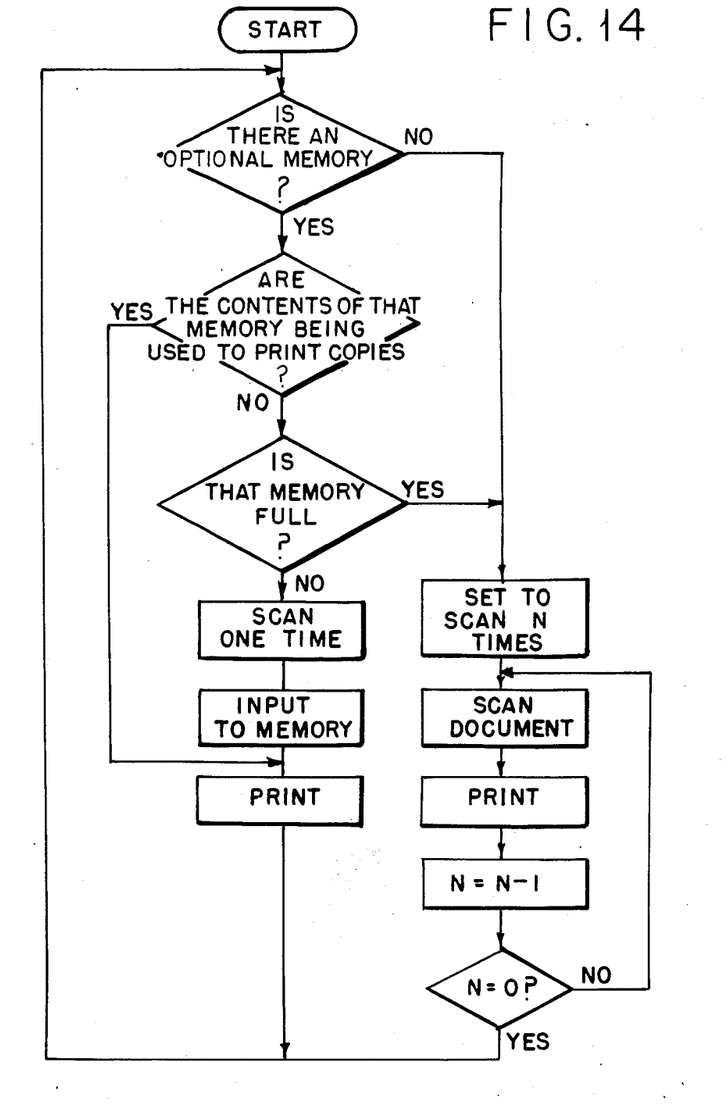
FIG. 14 shows the flow chart of the control circuit of FIG. 10 when a memory section is optionally used.
Figure 15A:
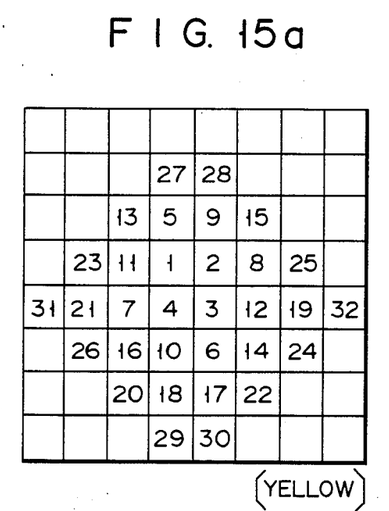
FIGS. 15a to 15d diagrammatically show the threshold levels of yellow, magenta, cyan and black when the colors are thermally transferred, as based on the dither technique.
Figure 15B:
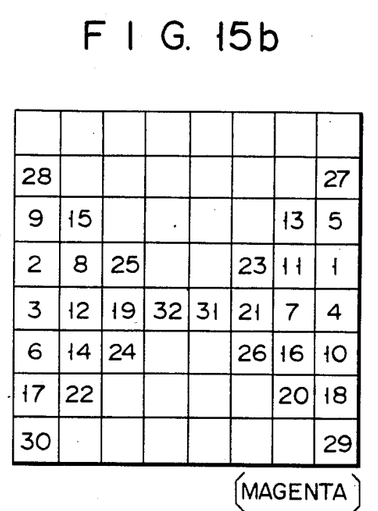
Figure 15C:
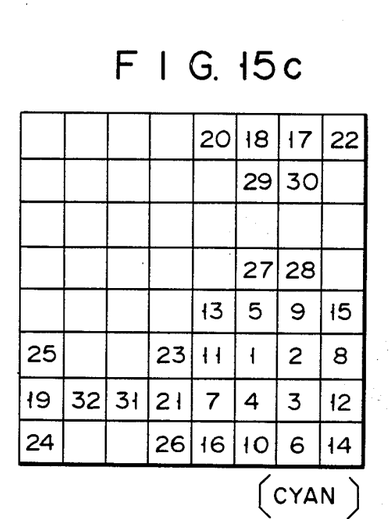
Figure 15D:
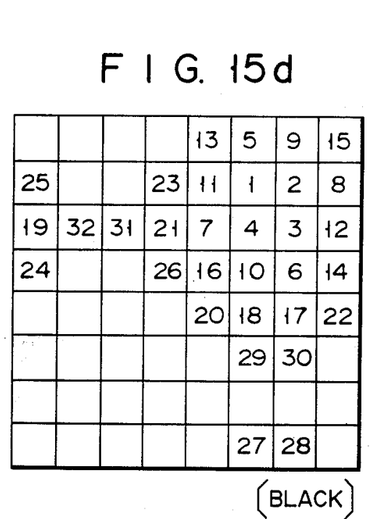

The present invention is applicable when a memory is optional. When setting or removing the memory section containing color signals, the document is scanned for each color and for each transfer operation. In another situation, as when mounting the memory section, no color signals are stored in the memory. The color signals of the respective colors are stared into the memory section by a single scanning, and the transfer is performed according to the contents stored. The operation flow in this case is charted in FIG. 14.

As seen from the foregoing, in the copy machine incorporating the present invention, the color mode can easily be changed from one to another, for example, from the full-color mode to the seven-color mode, from the full-color mode to the single color mode, or from the seven-color mode to the single color mode, by simply setting each color in the color specifying section.

Furthermore, by operating each density switch in the density setter, copy density can be changed in the multi-color copy containing halftones (full-color copy), the multi-color copy not including halftones (seven or less colors), or in a single color copy (red, yellow, blue or black). Note that the density is changed without changing the amount of light, thus being free from the erroneous operation of the machine due to noise. Additionally, the influence of the color transfer on processing by the density setter is made to vary between the multi-color copy containing halftones and that not containing halftones. This measure distingishes a full-color copy from a seven-color copy.

Finally, it is known that in the thermal transfer of yellow, magenta, cyan and black, use of the dither matrices with the threshold levels shown in FIGS. 15a to 15d provides good color superposition in the process of color transfer.

As described above, the color control system of the present invention guarantees that the color and copy density can be easily changed.

What is claimed is:

1. A thermal transfer color image forming apparatus for reproducing an image having an image color control function, said apparatus comprising:
   image information outputting means for providing image imformation in the form of a predetermined number of color component signals;
   image color designating means for selectively designating a set of colors to appear in the reproduced image, having at least first and second designating sections, said first designating section being for designating a first set of colors to appear in a reproduced image not containing halftones and said second designating section being for designating a second set of colors to appear in a reproduced image containing halftones;
   means for transferring a thermal transfer material comprising a plurality of thermal transfer coloring agents to an image formation medium for performing a non-halftone or halftone image formation process based on the first or second set of colors, respectively;
   color signal converting means having a color signal converting section for converting the predetermined number of color component signals to a plurality of color signals, each color signal corresponding to a respective thermal transfer coloring agent, a first matrix section for producing non-halftone color output signals when corresponding color signals from said color signal converting section equal or exceed corresponding predetermined threshold levels such that a first non-halftone transfer pattern is produced for each thermal transfer coloring agent, and a second matrix section for producing halftone color output signals when corresponding color signals from said color signal converting section equal or exceed corresponding predetermined dither matrix threshold levels such that a second halftone transfer pattern is produced for each thermal transfer coloring agent;
   means for conveying the image formation medium; and
   image formation means for causing said transferring means to transfer the thermal transfer coloring agents to the image formation medium in accordance with the first or second transfer patterns and the first or second set of colors to appear in the reproduced image, respectively.

2. The apparatus according to claim 1, further comprising a memory section for storing the plurality of color signals from said color signal converting section.

3. The apparatus according to claim 2, further comprising means for designating storage and readout modes in which said plurality of color signals are stored in or read out from said memory section, respectively.

4. The apparatus according to claim 1, further comprising a memory section for storing said first transfer patterns produced by said first matrix section.

5. The apparatus according to claim 1, further comprising a memory section for storing said second transfer patterns produced by said second matrix section.

6. A thermal transfer color image forming apparatus for reproducing an image having image color and image color density control functions, said apparatus comprising:
   image information outputting means for providing image information in the form of a predetermined number of color component signals;

image color designating means for selectively designating a set of colors to appear in the reproduced image, having at least first and second designating sections, the first designating section being for designating a first set of colors to appear in a reproduced image not containing halftones and the second designating section being for designating a second set of colors to appear in a reproduced image containing halftones;

image color density designating means having a predetermined number of color designating sections corresponding to at least some of said colors to appear in the reproduced image, each said color density designating section for selectively designating, within a respective predetermined range, a density at which a respective one of said colors is to appear in the reproduced image;

image color density information storing means having a predetermined number of density information storing sections corresponding to said predetermined number of color density designating sections, each said density information storing section storing density information within the corresponding respective predetermined range;

image color density information readout means for reading out, from said density information storing means, corresponding image color density information in accordance with designations made by the image color density designating means;

means for transferring a thermal transfer material comprising a plurality of thermal transfer coloring agents to an image formation medium for performing a non-halftone or halftone image formation process based on the first and second set of colors, respectively;

color signal converting means having a color signal converting section for converting the predetermined number of color component signals to a plurality of color signals, each color signal corresponding to a respective thermal transfer coloring agent, a first matrix section for producing non-halftone color output signals when corresponding color signals from said color signal converting section equal or exceed corresponding predetermined threshold levels such that a first non-halftone transfer pattern is produced for each thermal transfer coloring agent, and a second matrix section for producing halftone color output signals when corresponding color signals from said color signal converting section equal or exceed corresponding predetermined dither matrix threshold levels such that a second halftone transfer pattern is produced for each thermal transfer coloring agent;

density control means for selecting said predetermined threshold levels or said predetermined dither matrix threshold levels on the basis of the image color density information read out by said image color density information readout means;

means for conveying the image formation medium; and image formation means for causing said transferring means to transfer the thermal transfer coloring agents to the image formation medium in accordance with the first or second transfer patterns and the first or second set of colors to appear in the reproduced image, respectively.

7. The apparatus according to claim 6, further comprising a memory section for storing the plurality of color signals from said color signal converting section.

8. The apparatus according to claim 7, further comprising means for designating storage and readout modes in which said plurality of color signals are stored in or read out from said memory section, respectively.

9. The apparatus according to claim 6, further comprising a memory section for storing said first transfer patterns produced by said first matrix section.

10. The apparatus according to claim 6, further comprising a memory section for storing said second transfer patterns produced by said second matrix section.

* * * * *